United States Patent [19]
Wyld

[11] Patent Number: 5,737,311
[45] Date of Patent: Apr. 7, 1998

[54] FAILURE DETECTION METHOD IN A COMMUNICATION CHANNEL WITH SEVERAL ROUTES

[75] Inventor: Brian Christopher Wyld, Crolles, France

[73] Assignee: Hewlett-Packard Company, Palo Alto, Calif.

[21] Appl. No.: 587,864

[22] Filed: Jan. 11, 1996

[30]   Foreign Application Priority Data

Dec. 11, 1995 [EP]   European Pat. Off. ............ 95410139

[51] Int. Cl.⁶ .................................................. H04J 1/16
[52] U.S. Cl. ............................................ 370/227; 340/827
[58] Field of Search ........................ 370/60, 60.1, 94.1, 370/94.2, 94.3, 16, 13, 14, 54, 58.1, 216, 225, 227, 228, 389, 395, 252, 242, 247, 248, 249, 250, 251, 253, 256, 257, 408; 340/827, 825.01; 379/221; 395/181

[56]         References Cited
         U.S. PATENT DOCUMENTS 5,153,874  10/1992  Kohno ........................ 370/228
5,237,568   8/1993  Woest et al. ................. 370/85.13
5,243,593   9/1993  Woest et al. ................. 370/85.13

FOREIGN PATENT DOCUMENTS

0412320A1   2/1991   European Pat. Off. .
WO85/03825  8/1985   WIPO .

OTHER PUBLICATIONS

European Search Report, EP 95 41 0139, dtd 20 May 1996.

*Primary Examiner*—Dang Ton

[57]             ABSTRACT

A method is provided for detecting failure in a communication channel with at least two routes (A, B), through which at least two stations (X, Y) communicate. According to the method, at least one station repeatedly sends simultaneous messages on routes containing a sequence number, and receives messages from other station(s), containing an array of sequence numbers last received by other station(s) on each route. At least one station then detects failure of a route by comparing the sequence numbers of the array of the messages it receives. The method provides for failure detection independently of real time constraints. Also provided is a station for carrying out this method.

10 Claims, 1 Drawing Sheet

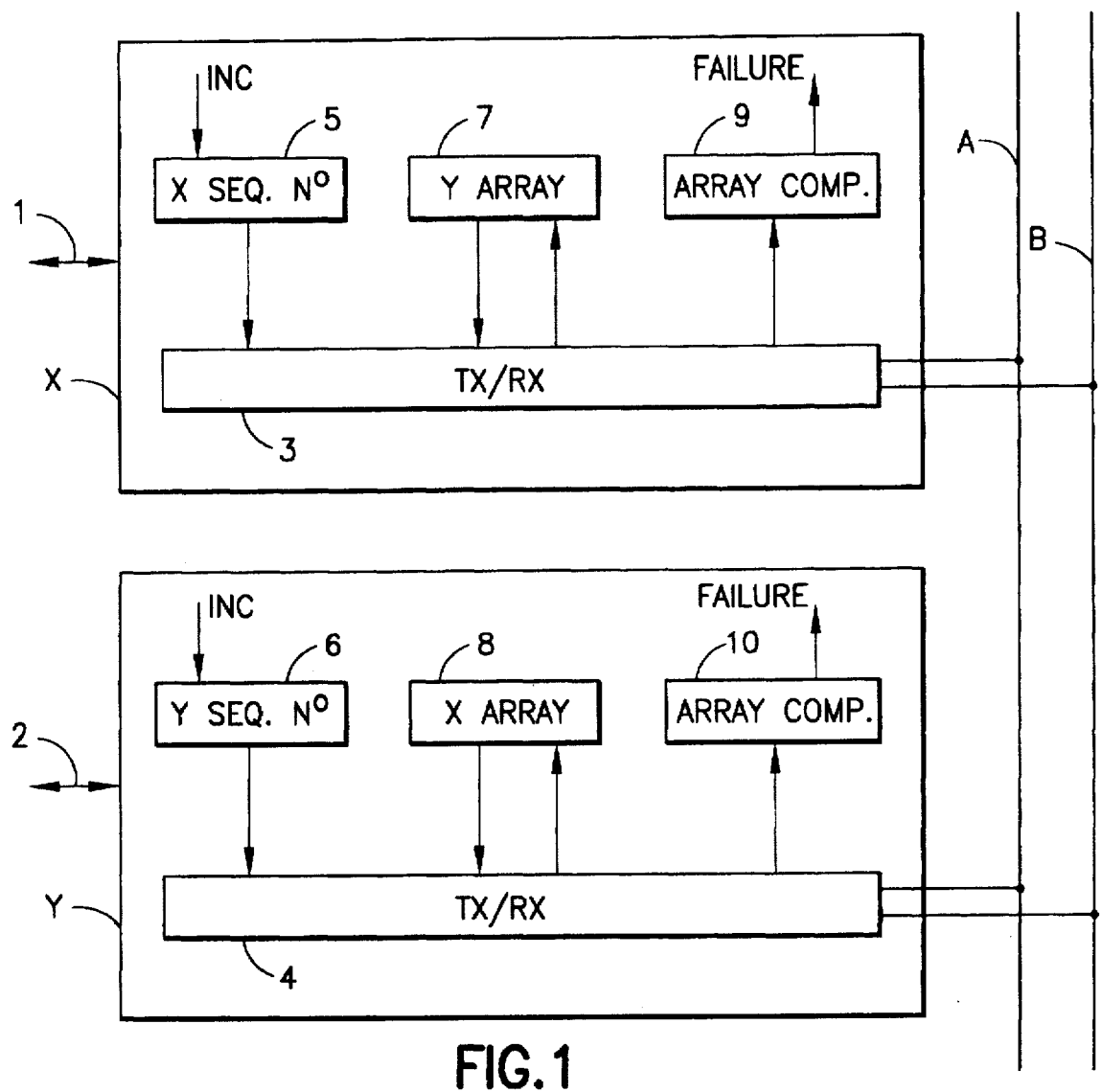

FAILURE DETECTION METHOD IN A COMMUNICATION CHANNEL WITH SEVERAL ROUTES

FIELD OF THE INVENTION

The invention relates to a failure detection method in a communication channel with at least two routes, through which at least two stations communicate, wherein at least one station repeatedly sends simultaneous messages on said routes containing a sequence number, and receives messages from other station(s).

It also relates to a station for carrying out such a method.

BACKGROUND OF THE INVENTION

There are many applications in which it is desirable to detect points of failure in a communication channel having several routes or physical links. One of these is the provision of fault tolerant communication channels.

Several solutions have been proposed in the past for eliminating points of failure in a communication channel having several routes or physical links.

A classical solution consists in sending, from one end of the communication channel, so-called heartbeat messages through the different routes of the communication channel, at known time intervals; at the other end, the reception of the heartbeat messages over the different routes is monitored, and a given route is considered as "dead" or out of order when the heartbeat messages cease to be received, possibly after a timeout delay.

According to a more elaborate solution, the heartbeat messages received at one end of the communication channel on one route are sent back, and a given route is considered as "dead" or out of order when the heartbeat messages sent back are not received, possibly after a timeout delay.

A problem of these known solutions is that the heartbeat messages may be transmitted, sent back or received by different applications or processes, running on different physical platforms, with different loads, and possibly at different speeds. Thus one process may be able to send or analyse heartbeat messages very quickly, while another will experience delay for some reason. In this case, a failure may be detected, although there is no actual problem with the route or physical link.

A further solution involves adjusting the timeout according to an average response time. This may prove satisfactory in most usual circumstances, but does not provide a simple and reliable solution in every case.

Another problem of these known solutions is that each process must monitor the communication channel and each of the routes or physical links. This may imply that each process using the communication channel be programmed accordingly.

It is thus an object of the invention to provide a simple and reliable method for detecting failures in a communication channel having several routes, which does not involve a time constraint in all processes or applications, and does not depend on the nature or speed of the physical support operating at each end of the communication channel.

SUMMARY OF THE INVENTION

According to the invention, there is provided a method for failure detection in a communication channel with at least two routes, through which at least two stations communicate, wherein at least one station repeatedly sends simultaneous messages on said routes containing a sequence number, and receives messages from other station(s), characterised in that the messages received from said other station(s) contain an array of sequence numbers last received by said other station(s) on each route; and in that said at least one station detects failure of a route by comparing the sequence numbers in the array contained in the messages it receives.

In an embodiment of this method, said sequence number is incremented by one each time a message is sent, and the comparing step is carried out by comparing each sequence number in the array with the highest sequence number in the array, a failure being detected when the result of a comparison is higher than a threshold value.

In this case, a detected failure may be ignored when the route that failed is flow-controlled.

According to another embodiment of the method, each station sends messages containing a sequence number proper to that station, and an array of sequence numbers last received from other station(s) on each route.

A station may send messages at regular time intervals, independently of the time at which it receives messages.

According to the invention, there is also provided a station for carrying out this method, comprising means for sending and receiving messages on a communication channel with at least two routes; means for storing and changing a current value of a sequence number; means for storing a current value of an array of sequence numbers last received on each route; and means for comparing sequence numbers in an array of sequence numbers contained in a received message.

BRIEF DESCRIPTION OF THE DRAWINGS

A communication channel with stations embodying the invention will now be described, by way of non-limiting example, with reference to the accompanying diagrammatic drawings in which:

In the drawings:

FIG. 1 is a diagrammatic representation of a communication channel having two routes or physical links.

FIGS. 2a–2b are diagrammatic representation of the content of a keep alive message sent from one end of a communication channel according to the invention.

BEST MODE OF CARRYING OUT THE INVENTION

FIG. 1 shows a schematic view of a communication channel having two routes or physical links, referenced A and B. These routes may for example include local area networks, where the communication channel is operating between different computer platforms. The physical links may actually comprise any transmission medium, on which a message may be sent and received. In a classical configuration, for providing a fault tolerant communication channel, one of the two routes is set to be active, while the other one is on standby.

In FIG. 1, are depicted two transmit/receive stations X and Y that use the routes A and B. Each of these stations may send or receive messages on each of the routes A and B. Between station X and Y, a communication channel is defined, having two routes A and B. Each station may be accessed by processes or applications, as symbolized by arrows 1 and 2, to use the communication channel. In a preferred embodiment, stations X (respectively Y) comprise messaging library programs on a computer platform, that provide for a communication channel with two physical routes.

As explained below, the invention is not limited to two stations or two routes: however, this is the simplest possible structure for carrying out the invention, and the description of the invention is therefore made with reference to this structure.

Station X (resp. Y) comprises means 3 (resp. 4) for sending and receiving messages on the communication channel, through routes A and B. Station X (resp. Y) also comprises means 5 (resp. 6) for storing and changing a current value of a X (resp. Y) sequence number to be incorporated in messages that are sent, and means 7 (resp. 8) for storing a current value of an array of Y (resp. X) sequence numbers last received on each route. Station X (resp. Y) finally comprises means 9 (resp. 10) for comparing sequence numbers in an array of sequence numbers contained in a received message, that provide a result indicative of the detection of a failure in the communication channel.

According to the invention, each station independently sends, at regular predetermined time intervals, a keep alive message, on both routes A and B. A possible value for this time interval is 200 ms. These messages have a known structure so that they may be recognised by each station. FIG. 2a shows the content of a keep alive message sent by station X, while FIG. 2b shows the content of a keep alive message sent by station Y. These keep alive message are similar and only the one in FIG. 2a will be described in detail.

The keep alive message sent by station X comprises two fields. The first field contains a sequence number hereinafter called "X sequence number". This sequence number is the same for all messages sent at the same time by station X and is updated, for example incremented by station X each time a keep-alive message is sent on routes A and B. The second field contains an array of keep alive sequence numbers, recording the current value of the Y sequence number that was last received on each route. In the case depicted in FIG. 1, the second field of a keep alive message sent by station X will contain an array of two sequence numbers: the first one is the Y sequence number of the last message received from station Y on route A; the second one is the Y sequence number of the last message received from station Y on route B. The structure of the keep alive messages sent by station Y is shown in FIG. 2b, and is basically similar, X being changed into Y and vice versa; thus, a complete description of FIG. 2b is not necessary: a message sent by station Y thus comprises a Y sequence number, and an array of two sequence numbers: the first one is the X sequence number of the last message received by station Y from station X on route A; the second one is the X sequence number of the last message received by station Y from station X on route B.

The operation of station X is now described. It should be clear that the operation of station Y is basically the same, so that there is no need to describe it in more detail. Station X has means for storing and changing a current value for a X sequence number, and for storing a current value for the array of Y sequence numbers last received on routes A and B.

Station X sends out on routes A and B a keep alive message at predetermined time intervals. Each keep alive message comprises in its first field the current value of the X sequence number, and in its second field the current value for the array of Y sequence numbers last received on routes A and B. The current value of the X sequence number is updated, being for example incremented after the sending of a keep alive message on routes A and B.

When station X receives on route A (respectively B) a keep alive message sent by station Y, station X reads the Y sequence member contained in the first field of the message, and updates the current value of the last Y sequence number received on route A (respectively B). This enables station X to send in the second field of the next keep alive message, an array of the Y sequence numbers last received on routes A and B.

After updating these values, station X reads the array of X sequence numbers last received by station, Y on routes A and B, that is contained in the second field of the keep alive message. Station X then compares the current values of the last X sequence number received by station Y on routes A and B. If the difference between the two current values is more than a given threshold—say two for instance—it means that there is some problem on the route for which the sequence number lags behind: indeed this means that at least two keep alive messages sent consecutively by station X have reached station Y via one route, but not via the other one.

Appropriate action may then be decided on; for instance in case of a communication channel with one active and one standby routes the route for which there is a problem is shut down, a new route is opened, and the standby route is made active if the one that was closed was previously active.

In the case keep alive messages are sent every 200 ms, and with a threshold value of two, as exemplified above, detection of a failure will occur after 2×200 ms+round trip time.

No attention is paid to how far behind the X sequence number received by station Y on routes A or B may be from the current value of the X sequence number; no attention is even paid to whether any keep alive messages are received at all by station X. Thus the invention is free from any dependence on time constraints in station X or in station Y, and provides a solution to the problems of the prior art heartbeat processes. Even if one of the stations is heavily loaded, there will be no false assumptions that one route or both are out of order.

Furthermore, since all routes are checked for reception in the same place at the same time, processing delays due to scheduling should not cause sent keep alive messages to contain out of sync values.

The invention thus provides a relative monitoring of the different routes or physical links of a communication channel. It will normally not detect the failure of all routes, since this would involve some real time dependency, with the problems outlined above. However, this kind of monitoring may easily be carried out at an application level, in an application using the communication channel according to the invention. By comparison with the prior art, this means that an application using a communication channel according to the invention will not have to monitor several routes, but should only have one single time out. This is not an important constraint, since it is usually provided inasmuch as the application expects to receive messages.

Another advantage of the invention is the provision of failure detection, independently of any application or process communicating through the communication channel. As symbolised by arrows 2 and 3 in FIG. 1, an application or process may access the communication channel without having to monitor different routes, or even to know that there are several routes.

The value of the threshold used for detecting a failure—two in the example given above—may be adjusted. A value of two allows for a small difference that may be due to timing, since a keep alive messages may arrive on one route to a station just after the ones coming from the other routes, the keep alive message being sent from that station meanwhile. The value of the threshold could be raised, for instance if it is expected that the keep alive messages may be processed slower on one route: this may be the case if there is a heavy traffic load on one route, or if there is some flow control on one route or the other. Adjusting the threshold value of course means that detection of a failure will be slower.

Another solution in case of flow control or heavy traffic is to use a more elaborate decision making process when the difference between the values received on several routes is above the threshold: the route that lags behind may be checked, and if it is flow controlled but still working, and/or if it received something—an application message or a keep alive message—recently, it may be allowed to remain alive. Indeed, the existence of a flow control mechanism could delay the transmission/reception of messages on one route, and lead to a false assumption that one route has failed. Checking that something has been received recently is a way of overcoming that problem. In this case, the decision making process may be carried out in a station, on the basis of information originating from the process or application that carries out the flow control. The decision making process may also be carried out in a station, by assuming there is always some flow control on certain routes, or according to the traffic load on each route.

The invention has been described in the simplest case of a communication between two stations on a communication channel with two routes or physical links. In the described embodiment, the sequence numbers were incremented by one each time a keep alive message was sent.

The invention is obviously not limited to this structure or to this specific embodiment.

The communication channel may have more than two routes: this will change the size of the array of sequence number last received, that will comprise one sequence number for each route. Furthermore, instead of simply comparing two sequence numbers when a keep alive message is received, a station should look for the maximum value of the last received sequence numbers contained in the array, and compare this maximum value with the other ones.

More than two stations may communicate on the communication channel. In this case, each station should be able to recognize the sender of a keep alive messages and this may be done in a manner known per se, for instance in a header; It is possible for the keep alive messages to be piggybacked on application messages if this proves convenient.

Obviously, if the communication channel only has to be monitored in one station, it may be sufficient that this station sends messages with a sequence number, and receives from the other station[s] messages with only an array of last received sequence numbers.

The invention may be carried out, as outlined above, with the help of messaging libraries. It may also be carried out by hardware solutions, as will be apparent to persons skilled in the art.

The inventions may advantageously be applied to provide fault tolerant communication between processes running on different platforms, in a manner transparent to the processes.

I claim:

1. A failure detection method for detecting route failure in a communication system in which a plurality of stations can communicate with each other through each of at least two independent routes, wherein at least one station repeatedly sends simultaneous messages containing a sequence number on said independent routes, and receives messages from at least one other station, wherein the messages received from said at least one other station contain an array of sequence numbers last received by said at least one other station on each independent route; and said at least one station detects failure of an independent route by comparing the sequence numbers in the array contained in the messages it receives.

2. The method according to claim 1, wherein said sequence number sent by said at least one station is incremented by one each time a message is sent, and wherein the comparing step is carried out by comparing each sequence number in the array with a highest of the sequence numbers in the array, a failure being detected when the result of a comparison is higher than a threshold value.

3. The method according to claim 2, wherein a detected failure is ignored when a route that failed is flow-controlled.

4. The method according to claim 1, wherein each station sends messages containing a sequence number proper to that station, and an array of sequence numbers last received from other station(s) on each route.

5. The method according to claim 1, wherein a station sends messages at regular time intervals, independently of the time at which it receives messages.

6. A station for carrying out a failure detection method in a communication system with at least two independent routes, through which at least two stations communicate, wherein at least one station repeatedly sends simultaneous messages containing a sequence number on said independent routes, and receives messages from at least one other station, wherein messages received from said at least one other station contain an array of sequence numbers last received by said at least one other station on each independent route, and wherein said at least one station detects failure of an independent route by comparing the sequence numbers in the array contained in received messages, said station comprising:

means for sending the simultaneous messages on the at least two independent routes and for receiving messages;

means for storing and changing a current value of a sequence number to be incorporated in messages that are sent;

means for storing a current value of the array of sequence numbers last received on each independent route; and means for comparing the sequence numbers contained in the array in a received message.

7. The station according to claim 6, wherein said sequence number sent by said at least one station is incremented by one each time a message is sent, and wherein the comparing step is carried out by comparing each sequence number in the array with a highest of the sequence numbers in the array, a failure being detected when the result of a comparison is higher than a threshold value.

8. The station according to claim 6, wherein each station sends messages containing a sequence number proper to that station, and an array of sequence numbers last received from said at least one other station on each route.

9. A communication system for performing a route failure detection method, said communication system comprising:

at least two independent communication routes;

a first station and a second station coupled to communicate with each other through each of said at least two independent communication routes, said first station repeatedly sending to said second station simultaneous messages containing a sequence number on both said independent communication routes, and receiving messages from said second station, which messages contain an array of sequence numbers last received by said second station on each of said two independent communication routes; and comparing means in said first station for detecting failure of at least one of said independent communication routes by comparing the sequence numbers in the array contained in the messages received from said second station.

10. The communication system according to claim 9, wherein said sequence number sent by said first station is incremented by one each time a message is sent, and said comparing means compares each sequence number in the array with a highest of the sequence numbers in the array, a failure being detected when the result of a comparison is higher than a threshold value.

* * * * *